United States Patent [19]

Gute

[11] Patent Number: 5,104,174
[45] Date of Patent: Apr. 14, 1992

[54] EXPANDABLE COVERED MIRROR VISOR

[75] Inventor: Robert M. Gute, Corunna, Mich.

[73] Assignee: Plasta Fiber Industries, Inc., Marlette, Mich.

[21] Appl. No.: 666,381

[22] Filed: Mar. 8, 1991

[51] Int. Cl.⁵ .............................................. B60J 3/00
[52] U.S. Cl. .................................. 296/97.4; 296/97.8
[58] Field of Search ............................ 296/97.4, 97.8

[56] References Cited

FOREIGN PATENT DOCUMENTS

| | | | |
|---|---|---|---|
| 2332613 | 1/1975 | Fed. Rep. of Germany | 296/97.8 |
| 3421850 | 12/1985 | Fed. Rep. of Germany | 296/97.8 |
| 445793 | 4/1936 | United Kingdom | 296/97.8 |

Primary Examiner—Johnny D. Cherry
Assistant Examiner—Andrew C. Pike
Attorney, Agent, or Firm—Brooks & Kushman

[57] ABSTRACT

Mechanism and method for controlling the retraction and extension of blades of an expandable visor wherein a lever mechanism interconnects at least a pair of blades enabling simultaneous movement between the retracted and the extended positions. The lever mechanism has a lever cooperating with a series of guide pins and guide slots inside the shell to control the direction and amount of travel of at least one pair of the blades. If desired, the mechanism enables independent movement of at least one of the blades or simultaneous movement of all the blades between the extended and retracted positions. The mechanism is designed to provide easy control and use of an expandable visor to ensure adequate glare protection from the sun's rays or other sources of light.

5 Claims, 2 Drawing Sheets

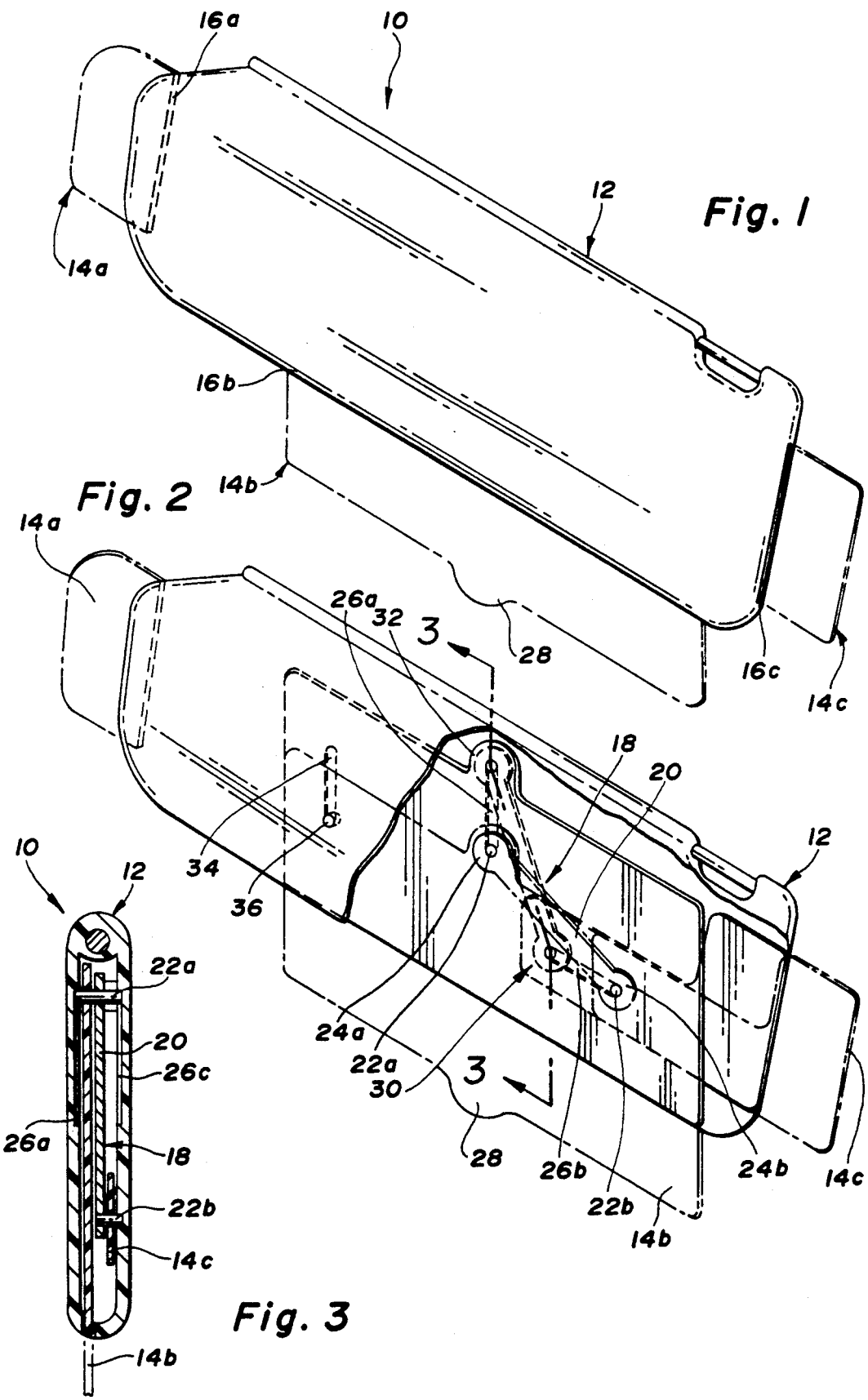

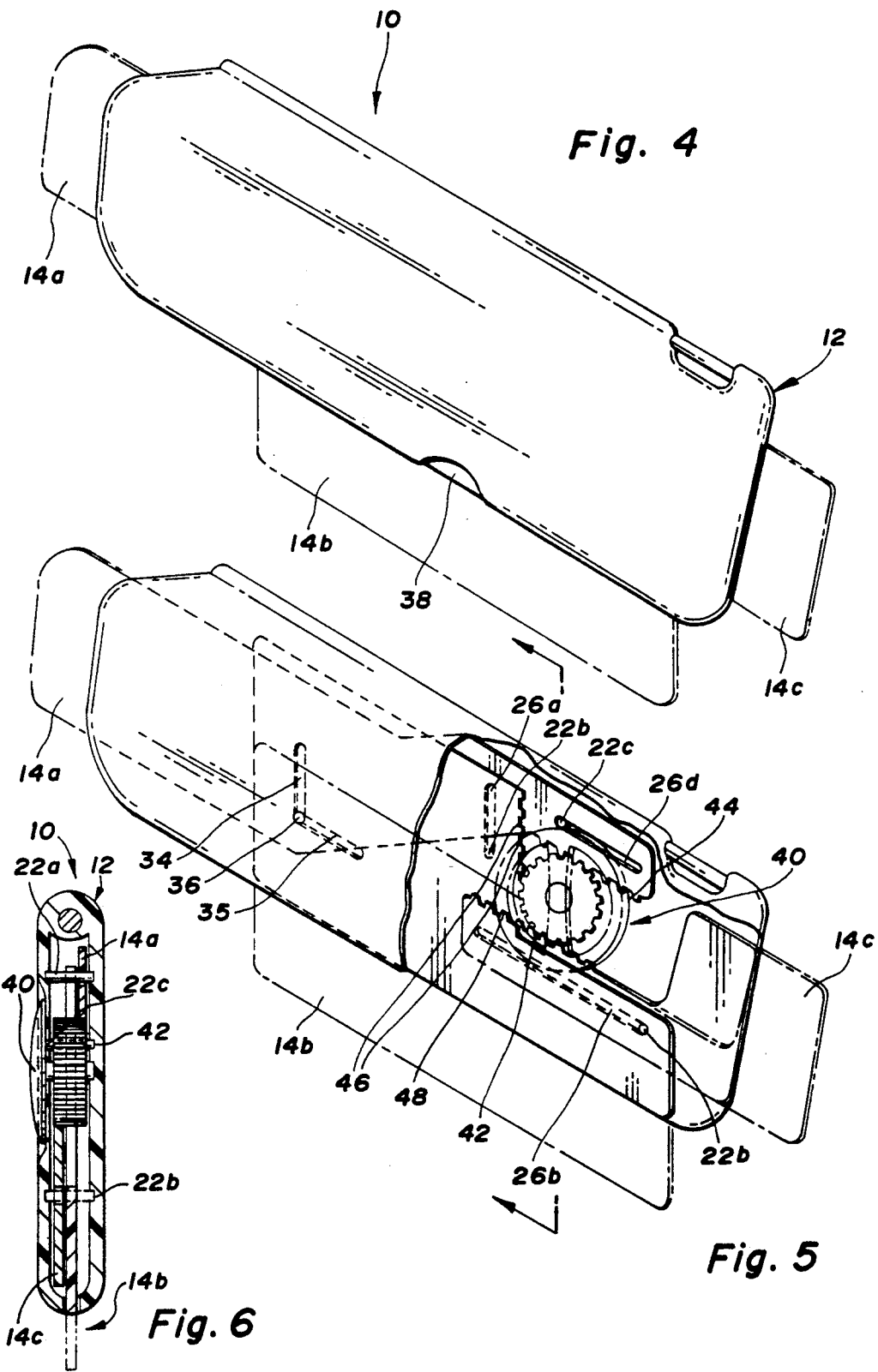

EXPANDABLE COVERED MIRROR VISOR

TECHNICAL FIELD

This invention relates to visors and in particular visors having extendable and retractable blades having a nearly flush mounted knob or lever on the back side of the visor to activate the maximum of three solid or opaque blades in three different directions which effectively block or screen out a majority of the glare caused by the sun or other sources of light.

BACKGROUND OF INVENTION

Visors are included as part of original equipment furnished with a motor vehicle to be disposed for extension across the windshield area of a motor vehicle in order to shield the driver and other occupants of a vehicle from the glare of the sun or alternative sources of light. The standard sunvisor does not provide sufficient protection from the sun's rays or other sources of light.

Numerous approaches have been taken to alleviate the problem. For example, Ward U.S. Pat. No. 2,385,557 discloses a light visor having two recesses or pockets enabling two panels to be withdrawn. Each panel may be individually withdrawn until a stop or trunnion engages shoulders in each of the respective recesses or pockets. In this construction, it is necessary to independently extend each panel manually to the desired position.

In Timperio U.S. Pat. No. 4,195,876 discloses a plurality of glare shields pivotally connected to the original visor by means of clips. The glare shields are then capable of being pivoted relative to the visor between active positions and inactive positions. Timperio's device requires modification of the original visor to attach each of the glare shields. In addition, it may be necessary based on prior usage, to reposition as many as two glare shields in order to position the desired glare shield according to the drivers needs.

Kuss U.S. Pat. No. 4,317,589 discloses a auxiliary visor that attaches to the vehicle's standard visor by means of a magnetized plate also affixed to the standard visor. A fastener such a bull clip is attached to a single magnet in turn attached to the auxiliary visor. The bull clip requires sufficient spring strength to rigidly hold the auxiliary visor in a position below the vehicle's standard visor in the operating position. The requirement of attaching a metallic plate to the visor may result in damage to the original equipment provided with the vehicle. Furthermore, only a single transparent filter is provided as extra glare protection.

Lutz U.S. Pat. No. 4,323,275 discloses a housing having auxiliary visors connected at two locations to the visor originally mounted on the motor vehicle. The auxiliary visors have end limiting stops which prevent complete withdrawal preventing the auxiliary visors from falling out of the housing. The housing is provided with a slot to assist in catching hold of the auxiliary visor to draw it out of the housing into the extended position. The bottom visor is withdrawable through a slot arranged in the front side of the housing causing the bending of the auxiliary visor as it passes through the slot resulting in an automatic breaking of the auxiliary visor upon drawing out. Such a construction requires a modification of the original visor in order to properly mount the housing containing the auxiliary visors. Furthermore, the mounting of the additional housing increases the width of the visor thereby interfering with the positioning of the visor in the stored position.

Matheopoulous U.S. Pat. No. 4,580,829 discloses an adjustable bi-directional vehicle visor pivotally mounted to the vehicle adjacent the windshield allowing horizontal rotation between a stored position and an operating position. The device has an opaque first visor and second transparent tinted visor which overlays the first visor in the stored position and is selectively pivotable about the first visor when in an operating position to permit shielding both at the front and side simultaneously. The second visor may also be positioned in parallel alignment below the first visor. In this construction, the second visor, although able to prevent glare in one of two positions, is incapable of protecting the occupant from glare in more than one direction at any given time.

Gavagan U.S. Pat. No(s). 4,728,142 and 4,828,313 disclose a visor assembly having one or more retractable glare screens integrated with the visor so as to be extended and retracted from the visor as required. The glare screens are guided for retracting movement by slot followers traveling in elongated guide slots formed by the visor center board member. The Gavagan device requires the occupant of the vehicle to individually pull each tab to the desired length to insure proper protection from the glare.

Hemmke, et al, U.S. Pat. No. 4,783,111 discloses a visor mounting bracket which in one embodiment supports at least one visor panel for spring-actuated, snap-up storage against a vehicle roof. The preferred embodiment has the mounting bracket adjustably support a first visor movable between a raised stored position and a lowered use position. A second panel slidably mounted to the first panel by interlocking arm means permits the second panel to be extended from either side of the first panel. In this construction, although possible to shield the occupant from glare on two sides, it is only possible to move the second visor slidably along a limited distance to attempt to shield glare occurring from the side. Furthermore, the second visor does not extend in parallel alignment below the first visor to provide additional glare protection below the standard sized visor.

Karford U.S. Pat. No. 4,792,176 discloses a visor extension unit which is adapted for releasable attachment to a conventional visor of a motor vehicle. The device includes a support frame having opposed surfaces and means for attaching one the surfaces to the body of the visor. A pair of guide passages at opposite ends of the unit enable the visor panel to be manually moved in a horizontal direction extending either from the left side or the right side based on the location of the sun. An additional extension panel is movable through a downwardly open end guide slot for downward vertical extension of the shield beyond the lower edge of the visor. In this construction, it is necessary to modify the original visor in order to attach this visor extension unit. Furthermore, at any given time, it is only possible to protect either the left or right side from glare.

Lee U.S. Pat. No. 4,824,161 discloses an automobile visor having a vertical series of pivotally connected shield plates which are suspended from a horizontal hanging portion of a hanging rod rotatably mounted on a roof panel. The shield plates are in horizontal alignment when unfolded, each containing a side slot having a side plate horizontally extendable therefrom. In this construction, it is necessary to unfold at least one plate and then extend the insert horizontally to protect against glare. Furthermore, it is not possible to protect against side glare with this configuration.

Dykstra, et al U.S. Pat. No. 4,858,982 discloses a multiplex visor including a plurality of nested panels movable with respect to one another. One embodiment shows a duplex visor longitudinally slit along a center curvilinear plane extending between the front and rear of the visor to provide a single visor having independently movable halves or panels for providing front and side window sun blocking protection. An embodiment showing a triplex visor includes three separate movable nested panels having a first panel and second panel similar to the first embodiment and third panel including a vanity mirror. In either configuration, the visor does not extend downwardly, nor does it extend horizontally along the right side to provide additional protection from glare.

Pusic, et al U.S. Pat. No. 4,902,062 discloses an electrically driven visor. Flowerday U.S. Pat. No. 4,624,499 discloses a visor with a pivotally concealed vanity mirror. Marcus, et al U.S. Pat. No. 4,486,819 discloses a vehicle visor lighting apparatus. These three patents were considered and not deemed applicable to the present application.

The present invention incorporates many of the known benefits of an extendable visor while improving the ease of use for the occupant of the vehicle.

DISCLOSURE OF INVENTION

An object of the present invention is to provide an expandable visor capable of controlling the movement of one or more blades by a single movement of one of the blades. To obtain the above object and other objects of the present invention in an expandable visor having a hollow shell and a plurality of blades, a lever mechanism is provided controlling coordinated movement of at least a pair of blades between the retracted and the extended positions. The lever mechanism includes a lever operating in conjunction with a series of guide pins and guide slots to ensure coordinated movement of the interconnected blades during extension and retraction.

Accordingly, an object of the present invention is to provide a relatively inexpensive mechanism for simultaneously controlling at least a pair of blades between the retracted and extended positions.

Another object of the present invention is to provide a lever mechanism capable of controlling at least a pair of blades but also adaptable to enable individual movement of the center blade or simultaneous movement of all blades between the retracted and extended positions.

A specific object of the present invention is to provide an expandable visor having a hollow shell with a plurality of clearance slots therein for access to the inside of the shell. A plurality of blades each movable through a respective slot between a retracted position inside the shell and an extended position outside the shell is provided, as well as a means for interconnecting at least a pair of the blades to enable simultaneous movement between the extended and the retracted positions when one of the pair of blades is moved.

Another specific object of the present is to provide a method of extending and retracting blades on an expandable visor by providing a push-pull tab on one of the blades, and providing a series of clearance slots on the expandable visor to receive these blades. A lever mechanism is provided within the expandable visor between at least some of the blades for controlling the direction and amount of extension or retraction of the blades. Next, a guide slot is provided on the expandable visor for cooperating with the lever mechanism to guide the blades during the extension and retraction thereof. First, pulling the tab activates the lever mechanism causing the lever mechanism to cooperate with the guide slot to simultaneously extend the blades to the desired length outside the expandable visor. Finally, pushing the tab simultaneously retracts the blades inside the expandable visor.

The above object's features and advantages are readily apparent from the following detailed description of the present invention when taken in connection with the accompanying drawings.

BRIEF DESCRIPTION OF DRAWINGS

FIG. 1 is a perspective view of an expandable visor constructed in accordance with the present invention;

FIG. 2 is a perspective view similar to that shown in FIG. 1, partially broken away showing the internal elements of the present invention;

FIG. 3 is a cross section taken along line 3—3 of FIG. 2 showing the internal operations of the lever mechanism;

FIG. 4 is a perspective view similar to that shown in FIG. 1, illustrating an alternative embodiment of the present invention;

FIG. 5 is a perspective view similar to that shown in FIG. 2, illustrating an alternative embodiment of the present invention; and FIG. 6 is a cross-sectional illustration taken along line 6—6 of FIG. 5 showing the flush mounting of the knob and internal operations of the knob and spur.

BEST MODE FOR CARRYING OUT INVENTION

Referring to FIGS. 1 through 5, FIG. 1 illustrates an expandable visor, generally indicated at 10, including a shell, generally indicated at 12, having three blades, generally indicated at 14a, 14b, and 14c, respectively.

The expandable visor 10 also includes a plurality of clearance slots, generally indicated at 16a, 16b, and 16c, respectively, which enable the blades 14a, 14b and 14c to freely travel between a retracted position within the shell 12 and an extended position outside the shell 12. The clearance slots 16a, 16b and 16c are located along the peripheral edges of the shell 12.

The internal elements of the expandable visor 10, are shown in FIG. 2. A lever mechanism, generally indicated at 18, is formed by a lever 20, and guide pins 22a and 22b connected at the distal ends 24a and 24b of the lever 20. The guide pins 22a and 22b are of sufficient length to be connected to the lever 20, the blades to be interconnected (in this embodiment blades 14b and 14c respectively) and to be seated within guide slots 26a, 26b, and 26c respectively, thereby controlling the direction and amount of travel of the blades (in this case 14b and 14c).

In the embodiment shown in FIG. 2, at least one blade (here 14b) contains a push-pull tab 28, centrally located at its outermost edge, which is used to initiate the action of extending or retracting the blades 14b and 14c.

The blade 14c is generally L-shaped having an elongated portion 30 to ensure that the blade 14c fits within the shell 12 when in the retracted position and provide the lever mechanism 18 with sufficient length necessary for smooth operation of the lever 20. The blade 14c is centrally located along the right-hand side of the shell 12. The blade 14c is intended to block glare coming from between the expandable visor 10 in its retracted position and a rear-view mirror (not shown).

Blade 14b is generally rectangular having an extension tab 32, at the upper surface of the blade 14b, required to ensure smooth operation of the lever 20 between the retracted and extended positions. The blade 14b is centrally located along the bottom edge of the shell 12 and is intended to block glare coming from below the expandable visor 10.

The third blade 14a in this embodiment operates independent of the pair of blades 14b and 14c. Blade 14a is generally rectangular and frictionally moves between the retracted and extended positions. It is possible to provide a further guide slot 35 (as shown in FIG. 5), cooperating with a fixed guide pin 36 and second lever (not shown), similar to the one used with blade 14b as discussed below, to control the direction and travel of blade 14a. The blade 14a is centrally located along the left-hand side of the shell 12 and is intended to block glare coming from the area between the left-hand side of the windshield (not shown) and the expandable visor 10, an area not normally covered by conventional visors.

An additional guide slot 34, is provided along the edge of blade 14b, and runs vertically to control the direction and amount of travel of blade 14b. A fixed guide pin 36 is connected to shell 12 and runs within the guide slot 34 to assist in this function.

In operation, the blades 14b and 14c move from the retracted position to the extended position (shown in phantom) by pulling the push-pull tab 28.

This causes blade 14b to travel outward away from the shell 12. As the blade 14b travels outward, the upper distal end 24a of the lever 20 and its related guide pin 22a travels downward within the guide slots 26a and 26c. The downward travel of upper distal end 24a results in the lower distal end 24b of the lever 20 travelling horizontally along guide slot 26b.

The result of this vertical and horizontal movement of lever 20 causes blades 14b and 14c to extend outward from the shell 12. By pushing the push-pull tab 28 toward the shell 12, the operation is reversed resulting in the retraction of blades 14b and 14c. At any time, independent of the movement of blades 14b and 14c, blade 14a may be extended or retracted as desired.

If desired, a release mechanism may be incorporated into the lever mechanism 18 allowing for the release of the lower distal end 24b of lever 20 enabling independent movement of blades 14b and 14c. Furthermore, an additional lever may be added to interconnect blades 14a and 14b thereby allowing for all blades 14a, 14b, and 14c to be operated simultaneously. Additional variations are also possible enabling independent movement of all blades 14a, 14b and 14c respectively or any two blades operating in unison leaving one blade to operate independently.

FIGS. 4 and 5 depict alternative embodiments of the expandable visor 10. FIG. 4 shows an access notch 38 so that at least one blade (in this embodiment blade 14b) is used instead of the push-pull tab 28 to assist in gripping the blade 14b in its retracted position.

FIG. 5 illustrates a knob 40 which is generally flush mounted to the surface of the shell 12. The knob has a spur 42 operated by the knob 40, for controlling the amount of extension and retraction of the blades 14a, 14b, and 14c. To ensure smooth operation of the blades 14a, 14b, and 14c an additional guide slot 26d and guide pin 22c is located above the spur gear 42. In this embodiment, all the blades 14a, 14b, and 14c have toothed edges 44, 46, and 48 along one edge of the blades 14a, 14b, and 14c respectively which cooperate with the spur gear 42.

If desired, a mirror 49, not shown, either covered or uncovered, may be incorporated into the shell 12 of any of the embodiments shown of the expandable visor 10. Although particular embodiments of the present invention have been illustrated in the accompanying drawings and described in the foregoing detailed description, it is to be understood that the present invention is not to be limited to just the embodiments disclosed, but that they are capable of numerous rearrangements, modifications, and substitutions without departing from the scope of the claims hereafter.

What is claimed is:

1. An expandable visor comprising:
    a hollow shell having a plurality of clearance slots therein for access to an inside of the shell,
    a plurality of blades each moveable through the respective clearance slot between a retracted position inside the shell and an extended position outside the shell, and
    means interconnecting at least two of the blades for simultaneous movement between the extended and the retracted positions when one of the two of the blades is moved, said means interconnecting including a lever mechanism for connecting at least the two of the blades, the lever mechanism having a guide pin on each of the two of the blades and a lever connected at opposite ends thereof with a respective one of the guide pins for moving the respective blades between the retracted position and the extended position; and
    the shell including a pair of guide slots, each of the guide pins extending into a respective one of the guide slots for guiding the respective blades during movement between the retracted position and the extended position.

2. The expandable visor of claim 1, wherein the interconnecting means cooperates with an extension on each of the two of the blades inside of the shell to facilitate and coordinate movement of the two of the blades.

3. An expandable visor comprising:
    a hollow shell having a plurality of clearance slots therein for access to an inside of the shell,
    a plurality of blades each movable through a respective one of the plurality of clearance slots between a retracted position inside the shell and an extended position outside the shell, and means interconnecting at least two of the blades for simultaneous movement between the extended and the retracted positions when one of the two of the blades is moved, and wherein the means interconnecting includes
    a knob and a spur gear operated by the knob to move the one of the two of the blades.

4. The expandable visor of claim 3, wherein the knob is mounted so as to be generally flush with the shell.

5. A method of extension and retraction of blades on an expandable visor comprising:
    providing a knob on the expandable visor,
    providing a series of clearance slots on the expandable visor to receive the blades, providing a spur gear within the expandable visor between at least some of the blades and operable by the knob for controlling the extension or retraction of the blades, providing a guide slot on each of the blades for cooperating with the spur gear when operated by the knob to guide the blades during the extension and retraction of the blades;

operating the knob in one direction thereby activating the spur gear, causing the spur gear to cooperate with the guide slots to simultaneously extend the blades outside the expandable visor; and operating the knob in another direction thereby activating the spur gear causing the spur gear to cooperate with the guide slots to simultaneously retract the blades inside the expandable visor.

* * * * *